US009236681B2

(12) United States Patent
Yu et al.

(10) Patent No.: US 9,236,681 B2
(45) Date of Patent: Jan. 12, 2016

(54) CARD CONNECTOR

(71) Applicant: Cheng Uei Precision Industry Co., Ltd., New Taipei (TW)

(72) Inventors: Sheng Nan Yu, New Taipei (TW); Chih Hsien Chiang, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 32 days.

(21) Appl. No.: 14/222,434

(22) Filed: Mar. 21, 2014

(65) Prior Publication Data

US 2015/0270639 A1    Sep. 24, 2015

(51) Int. Cl.
*H01R 13/52* (2006.01)
*H01R 13/629* (2006.01)
*H01R 12/72* (2011.01)

(52) U.S. Cl.
CPC .......... *H01R 13/5219* (2013.01); *H01R 12/721* (2013.01); *H01R 13/62994* (2013.01)

(58) Field of Classification Search
CPC .......... H01R 13/5219; H01R 13/5202; H01R 13/5221; H01R 13/521; H01R 13/523; H01R 13/6335; H01R 13/6658; H01R 13/658; H01R 13/06; H01R 13/631; H01R 23/025; H01R 23/7068; H01R 23/661; H01R 2103/00; H01R 24/58; Y02E 60/12; B25B 9/00
USPC ............... 439/271, 483, 476.1, 76.1
See application file for complete search history.

(56) References Cited

U.S. PATENT DOCUMENTS

| | | | | |
|---|---|---|---|---|
| 5,385,487 A * | 1/1995 | Beitman | | 439/540.1 |
| 6,168,459 B1 * | 1/2001 | Cox et al. | | 439/495 |
| 7,048,556 B2 * | 5/2006 | Stanton et al. | | 439/135 |
| 7,066,748 B2 * | 6/2006 | Bricaud et al. | | 439/159 |
| 7,309,016 B2 * | 12/2007 | Lev et al. | | 235/472.01 |
| 7,335,044 B2 * | 2/2008 | Lai et al. | | 439/326 |
| 7,611,371 B2 * | 11/2009 | Guo | | 439/367 |
| 7,819,678 B2 * | 10/2010 | Ye et al. | | 439/159 |
| 7,878,858 B1 * | 2/2011 | Tung et al. | | 439/630 |
| 7,950,964 B1 * | 5/2011 | Little | | 439/630 |
| 7,980,870 B2 * | 7/2011 | Tung et al. | | 439/159 |
| 8,025,510 B2 * | 9/2011 | Bolshakov et al. | | 439/136 |
| 8,109,794 B2 * | 2/2012 | Tanaka et al. | | 439/630 |
| 8,147,262 B1 * | 4/2012 | Su et al. | | 439/159 |
| 8,186,726 B2 * | 5/2012 | Zuo | | 292/57 |
| 8,460,019 B2 * | 6/2013 | Lai | | 439/159 |
| 8,460,021 B1 * | 6/2013 | Lee et al. | | 439/159 |
| 8,465,325 B1 * | 6/2013 | Chan et al. | | 439/630 |
| 8,500,471 B1 * | 8/2013 | Chan et al. | | 439/159 |

(Continued)

*Primary Examiner* — Abdullah Riyami
*Assistant Examiner* — Vladimir Imas
(74) *Attorney, Agent, or Firm* — Cheng-Ju Chiang

(57) ABSTRACT

A card connector for being assembled in an electrical device includes an insulating housing defining a receiving cavity and a sliding groove, a shielding shell covering on the insulating housing and covering up the receiving cavity to form a receiving slot between the shielding shell and the insulating housing, an ejection mechanism slidably assembled in the sliding groove of the insulating housing, a supporting unit inserted in the receiving slot, and a water-proof mechanism including pushing parts and water-proof parts. The electrical device includes a cover covered in front of the card connector. The pushing parts pass rearward through the cover to be respectively fixed with front ends of the supporting unit and the ejection mechanism. The water-proof parts are respectively worn around the pushing parts and press against the cover.

4 Claims, 4 Drawing Sheets

(56) References Cited

U.S. PATENT DOCUMENTS

| | | | |
|---|---|---|---|
| 8,662,905 B2 * | 3/2014 | Chang | 439/142 |
| 8,711,568 B2 * | 4/2014 | Evens | 361/728 |
| 8,747,163 B2 * | 6/2014 | Little et al. | 439/630 |
| 8,926,345 B2 * | 1/2015 | Kim et al. | 439/142 |
| 2013/0114225 A1 * | 5/2013 | Schack et al. | 361/781 |

* cited by examiner

CARD CONNECTOR

BACKGROUND OF THE INVENTION

1. Field of the Invention

The present invention relates to a card connector, and more particularly to a card connector having a water-proof function.

2. The Related Art

An electrical connector is often disposed in an electrical device to realize signal transmission between the electrical device and peripheral equipments thereof. A card connector acted as one kind of the electrical connectors is frequently used in the electrical device, such as mobile phone, tablet PC (tablet personal computer) and digital camera, for receiving an electronic card therein.

However, there is often an interspace between the card connector and the electrical device after the card connector is assembled in the electrical device. As a result, the moisture and the water easily seep into the inner of the card connector through the interspace. It greatly reduces the working life of the card connector and the electrical device.

SUMMARY OF THE INVENTION

Accordingly, an object of the present invention is to provide a card connector for being assembled in an electrical device and receiving an electronic card therein. The electrical device includes a cover. The card connector includes an insulating housing, a shielding shell, an ejection mechanism, a supporting unit and a water-proof mechanism. The insulating housing has a bottom wall, a rear wall and two side walls which together form a receiving cavity. A sliding groove is opened in one side wall of the insulating housing. The shielding shell covers on the insulating housing and covers up the receiving cavity to form a receiving slot between the shielding shell and the insulating housing. The ejection mechanism is slidably assembled in the sliding groove of the insulating housing. The supporting unit is inserted in the receiving slot for carrying the electronic card thereon. The water-proof mechanism includes pushing parts and water-proof parts. The cover of the electrical device is covered in front of the card connector. The pushing parts pass rearward through the cover to be respectively fixed with front ends of the supporting unit and the ejection mechanism. The water-proof parts are respectively worn around the pushing parts and press against the cover.

As described above, the card connector utilizes the pushing parts of the water-proof mechanism to be fixed with the supporting unit and the ejection mechanism together, and the water-proof parts to be worn around the pushing parts respectively and press against the cover of the electrical device, so as to effectively prevent the moisture and the water seeping into the inner of the card connector through between the pushing parts and the cover.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
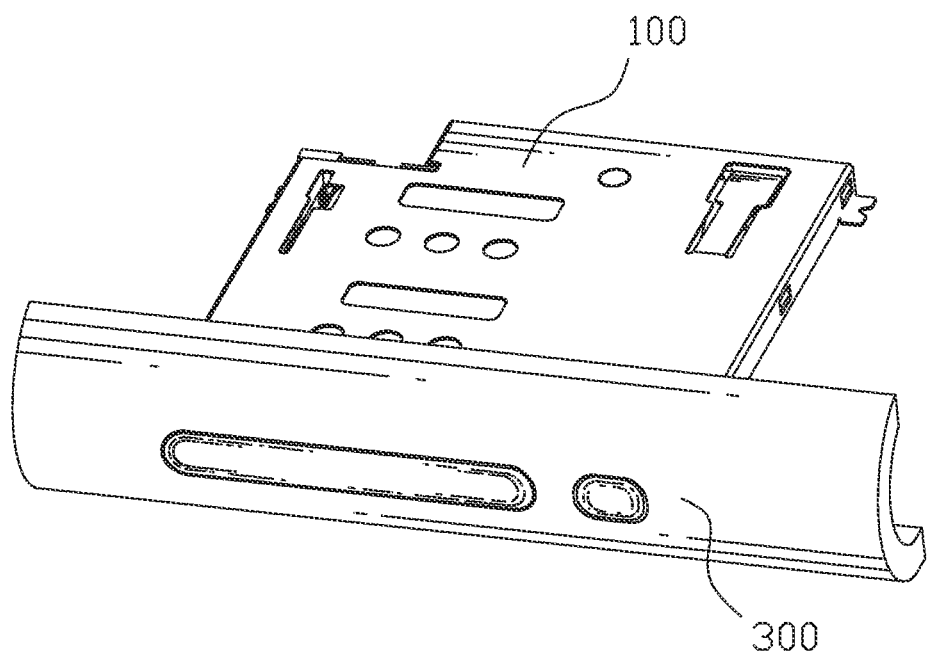
FIG. 1 is an assembled, perspective view of a card connector and a cover of an electrical device in accordance with an embodiment of the present invention.
Figure 2:
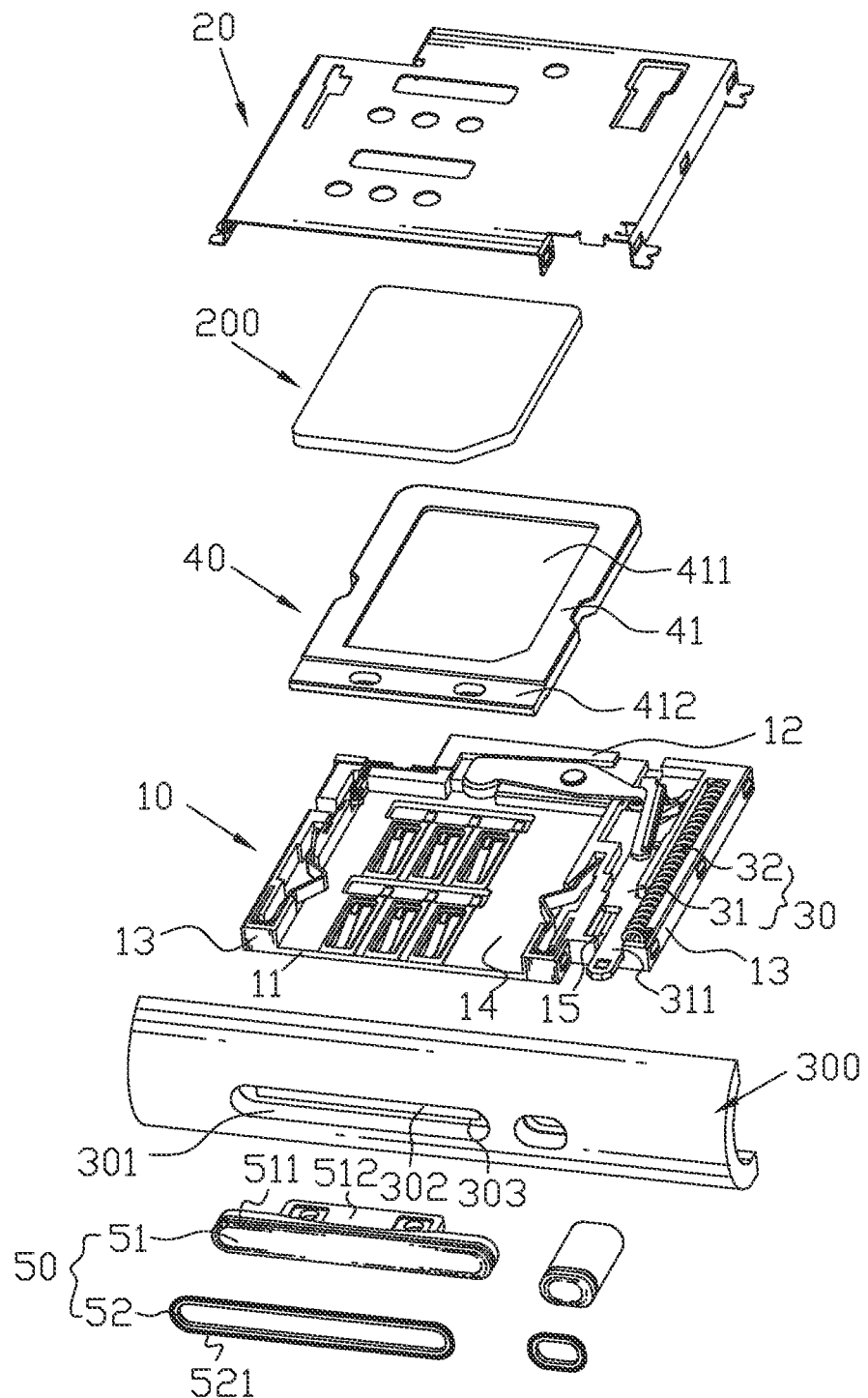
FIG. 2 is an exploded, perspective view of the card connector shown in FIG. 1.
Figure 3:
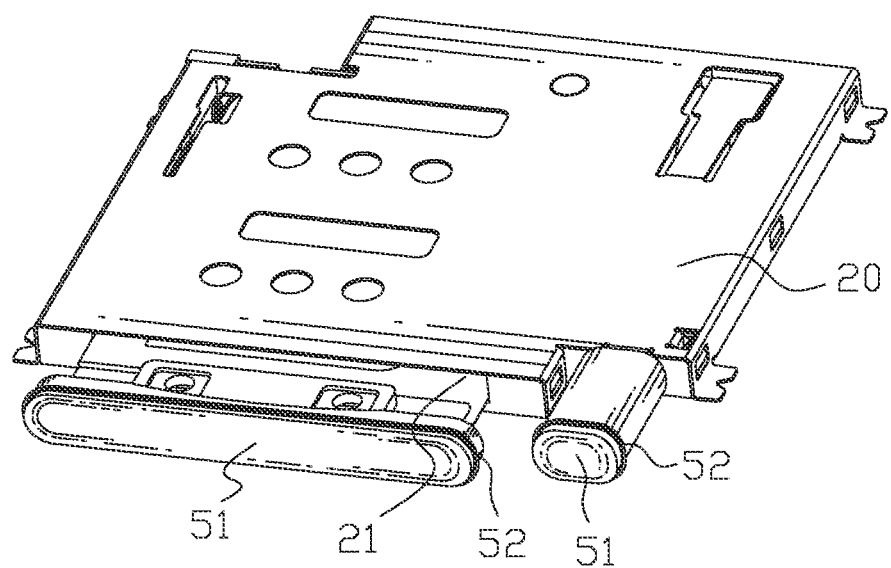
FIG. 3 is an assembled, perspective view of the card connector shown in FIG. 1.
Figure 4:
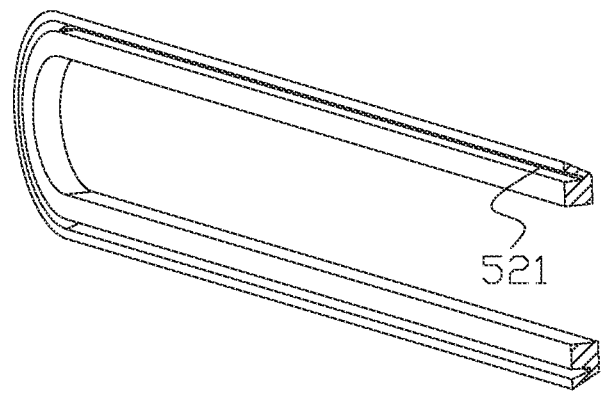
FIG. 4 is a sectional perspective view of a water-proof part of the card connector shown in FIG. 1.

With reference to FIGS. 1 to 4, an embodiment of the present invention is shown as a card connector 100 for being assembled in an electrical device (not shown) and receiving an electronic card 200 therein. The electrical device includes a cover 300. The cover 300 of the electrical device is covered in front of the card connector 100. A front face of the cover 300 of the electrical device is concaved rearward to form an inserting slot 301. A central part of a rear sidewall of the inserting slot 301 is further concaved rearward to form a through slot 302 penetrating through the cover 300 and facing the card connector 100. A ring-shaped blocking partition 303 is formed at the junction of the inserting slot 301 and the through slot 302. The card connector 100 includes an insulating housing 10, a shielding shell 20, an ejection mechanism 30, a supporting unit 40 and a water-proof mechanism 50.

The insulating housing 10 has a bottom wall 11, a rear wall 12 and two side walls 13 which together form a receiving cavity 14. A sliding groove 15 is opened in one side wall 13 of the insulating housing 10. One through slot 302 of the cover 300 of the electrical device is facing the sliding groove 15 of the card connector 100.

The shielding shell 20 covers on the insulating housing 10 and covers up the receiving cavity 14 to form a receiving slot 21 between the shielding shell 20 and the insulating housing 10. Another through slot 302 of the cover 300 of the electrical device is facing the receiving slot 21.

The ejection mechanism 30 is slidably assembled in the sliding groove 15 of the insulating housing 10. The ejection mechanism 30 includes an ejection component 31 and a spring 32. A front of the ejection component 31 protrudes forward to form a pushing portion 311. The spring 32 is elastically against the insulating housing 10 and the ejection component 31 of the ejection mechanism 30. The pushing portion 311 projects forward out of the sliding groove 15 of the insulating housing 10.

The supporting unit 40 is inserted in the receiving slot 21 for carrying the electronic card 200 thereon. The supporting unit 40 includes a card holder 41 in which a receiving chamber 411 is opened. The electronic card 200 is received in the receiving chamber 411 of the supporting unit 40. A front end of the card holder 41 protrudes forward to form a connecting portion 412.

The water-proof mechanism 50 includes pushing parts 51 and water-proof parts 52. The water-proof parts 52 are respectively worn around the pushing parts 51. In detail, a positioning groove 511 is concaved to surround each pushing part 51 and shows a ring shape. A rear side of the pushing part 51 protrudes rearward to form a buckling portion 512. The buckling portions 512 pass through the through slots 302 of the cover 300 to be respectively fixed with the pushing portion 311 of the ejection mechanism 30 and the connecting portion 412 of the supporting unit 40. The inner half ring of the water-proof part 52 is closely positioned in the positioning groove 511 of the pushing part 51 and the outer half ring of the water-proof part 52 projects outward beyond the pushing part 51 and presses against the inner side of the inserting slot 301 of the cover 300. A front side of each water-proof part 52 is concaved rearward to form a ringlike water-proof groove 521. In use, push the pushing parts 51 rearward to drive the supporting unit 40 into the receiving slot 21 until the ejection component 31 of the ejection mechanism 30 is locked in the sliding groove 15 of the insulating housing 10. At this state, a part of the pushing part 51 resists against the blocking partition 303 of the cover 300, and the outer half ring of the water-proof part 52 presses against the inner side of the inserting slot 301 of the cover 300 to drain the water out of the water-proof groove 521 and further prevent the moisture and the water seeping into the inner of the card connector 100 through between the pushing part 51 and the cover 300.

As described above, the card connector 100 utilizes the pushing parts 51 of the water-proof mechanism 50 to be fixed with the supporting unit 40 and the ejection mechanism 30 together, and the water-proof parts 52 to be worn around the pushing parts 51 respectively and press against the inner sides of the inserting slots 301 of the cover 300 of the electrical device, so as to drain the water out of the water-proof grooves 521 of the water-proof parts 52 and further effectively prevent the moisture and the water seeping into the inner of the card connector 100 through between the pushing parts 51 and the cover 300.

What is claimed is:

1. A card connector for being assembled in an electrical device and receiving an electronic card therein, the electrical device including a cover, the card connector comprising:
    an insulating housing having a bottom wall, a rear wall and two side walls which together form a receiving cavity, a sliding groove being opened in one side wall of the insulating housing;
    a shielding shell covering on the insulating housing and covering up the receiving cavity to form a receiving slot between the shielding shell and the insulating housing;
    an ejection mechanism slidably assembled in the sliding groove of the insulating housing;
    a supporting unit inserted in the receiving slot for carrying the electronic card thereon; and
    a water-proof mechanism including pushing parts and water-proof parts, the cover of the electrical device being covered in front of the card connector, the pushing parts passing rearward through the cover to be respectively fixed with front ends of the supporting unit and the ejection mechanism, the water-proof parts being respectively worn around the pushing parts and pressing against the cover;
    wherein a front face of the cover of the electrical device is concaved rearward to form an inserting slot, a central part of a rear sidewall of the inserting slot is further concaved rearward to form a through slot penetrating through the cover and facing the receiving slot and the sliding groove of the card connector, a ring-shaped blocking partition is formed at the junction of the inserting slot and the through slot, a rear side of the pushing part protrudes rearward to form a buckling portion, the buckling portions pass through the through slots to be respectively fixed to the supporting unit and the ejection mechanism, a part of the pushing part resists against the blocking partition of the cover, and the water-proof parts press against the inner side of the inserting slot of the cover.

2. The card connector as claimed in claim 1, wherein a positioning groove is concaved to surround each pushing part and show a ring shape, a front side of each water-proof part is concaved rearward to form a ringlike water-proof groove, the inner half ring of the water-proof part is closely positioned in the positioning groove of the pushing part and the outer half ring of the water-proof part projects outward beyond the pushing part.

3. The card connector as claimed in claim 1, wherein the ejection mechanism includes an ejection component and a spring, a front of the ejection component protrudes forward to form a pushing portion, the spring is elastically against the insulating housing and the ejection component of the ejection mechanism, the pushing portion projects forward out of the sliding groove of the insulating housing and is connected to one pushing part of the water-proof mechanism.

4. The card connector as claimed in claim 1, wherein the supporting unit includes a card holder in which a receiving chamber is opened, a front end of the card holder protrudes forward to form a connecting portion connected to another pushing part of the water-proof mechanism.

\* \* \* \* \*